United States Patent
Herudek et al.

(10) Patent No.: US 10,766,425 B2
(45) Date of Patent: Sep. 8, 2020

(54) BUMPER PROTECTION DEVICE

(71) Applicant: Ford Global Technologies, LLC, Dearborn, MI (US)

(72) Inventors: Claudia Herudek, Aachen (DE); David van Bebber, Aachen (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 210 days.

(21) Appl. No.: 15/950,251

(22) Filed: Apr. 11, 2018

(65) Prior Publication Data

US 2019/0016266 A1   Jan. 17, 2019

(30) Foreign Application Priority Data

Jul. 17, 2017  (DE) .......... 10 2017 212 188

(51) Int. Cl.
  *B60R 5/04*   (2006.01)
  *E05F 5/02*   (2006.01)
  *E05F 5/08*   (2006.01)

(52) U.S. Cl.
  CPC .......... *B60R 5/041* (2013.01); *E05F 5/022* (2013.01); *E05F 5/08* (2013.01); *E05Y 2900/546* (2013.01)

(58) Field of Classification Search
  CPC ................ B60R 5/041; E05F 5/022
  USPC ...... 296/57.1, 76, 146.8, 26.08, 26.09, 26.1, 296/26.11, 56; 293/145, 144, 28
  See application file for complete search history.

(56) References Cited

U.S. PATENT DOCUMENTS

| | | | | |
|---|---|---|---|---|
| 3,902,752 A | * | 9/1975 | Pelletier | B60J 11/06 280/727 |
| 6,540,278 B2 | * | 4/2003 | Presley | B62D 33/0273 296/106 |
| 6,644,707 B2 | * | 11/2003 | McLaughlin | B60R 5/041 224/311 |
| 2004/0164587 A1 | * | 8/2004 | Pickard | B60R 5/04 296/136.07 |
| 2015/0061319 A1 | * | 3/2015 | Johnson | B62D 33/023 296/183.1 |

FOREIGN PATENT DOCUMENTS

| | | |
|---|---|---|
| DE | 19626582 A1 | 1/1998 |
| DE | 19738282 A1 | 3/1999 |
| DE | 10012767 A1 | 10/2001 |
| DE | 102006043223 A1 | 3/2008 |
| DE | 102006059670 A1 | 6/2008 |
| DE | 102008010923 A1 | 8/2009 |
| GB | 635187 | 4/1950 |
| GB | 2512434 A | 1/2014 |

* cited by examiner

*Primary Examiner* — Joseph D. Pape
(74) *Attorney, Agent, or Firm* — David Coppiellie; Carlson, Gaskey & Olds, P.C.

(57) ABSTRACT

The present disclosure relates to a bumper protection device and a motor vehicle including the same. A method of use is also disclosed. An example bumper protection device includes, among other things, a protective strip moveable between a retracted position and an extended position, a spring biasing the protective strip to the extended position, and a closure arranged such that movement of the closure to a closed position urges the protective strip to the retracted position, and such that movement of the closure to an open position permits movement of the protective strip to the extended position.

16 Claims, 3 Drawing Sheets

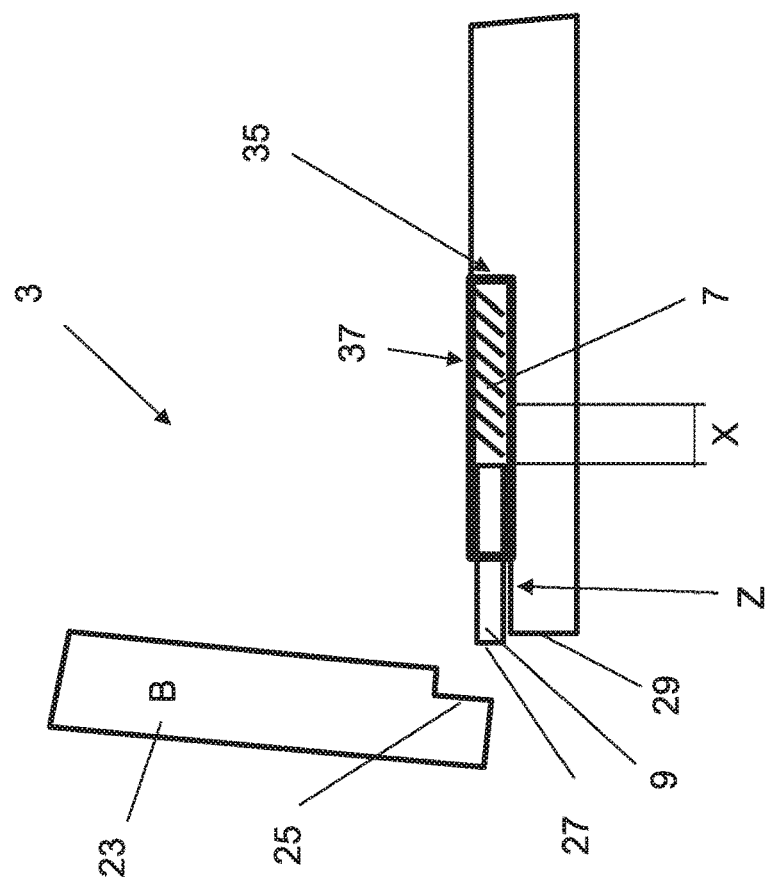
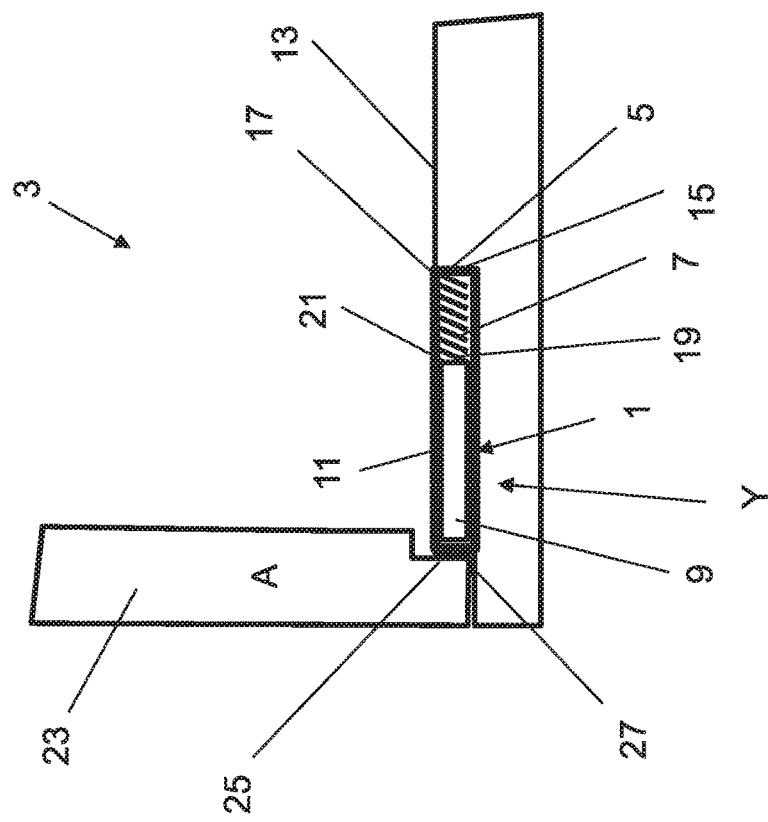
Fig. 1a
Fig. 1b

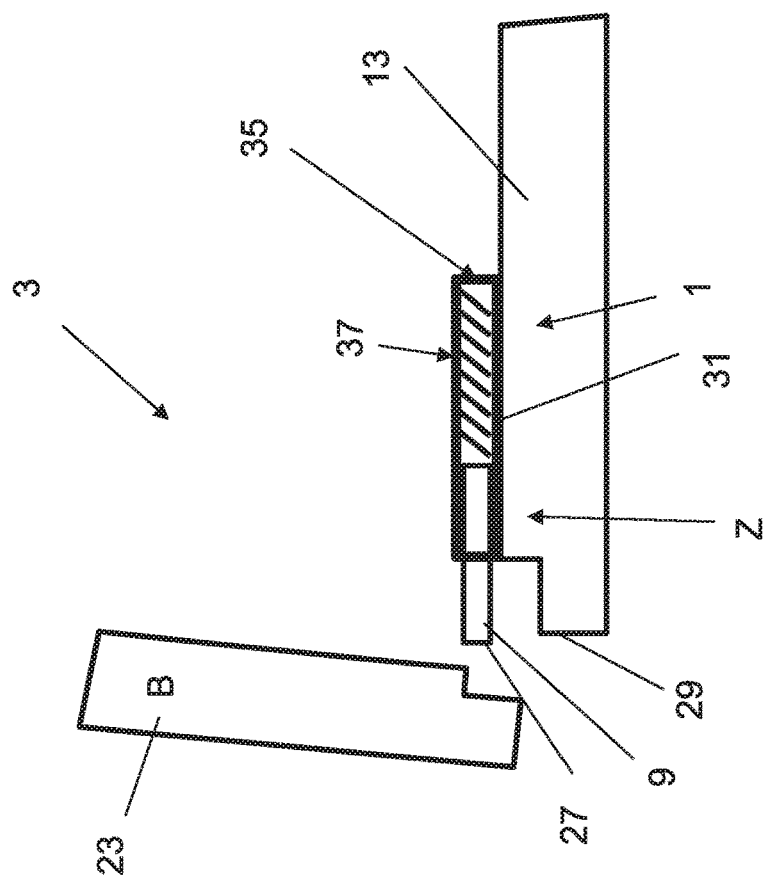
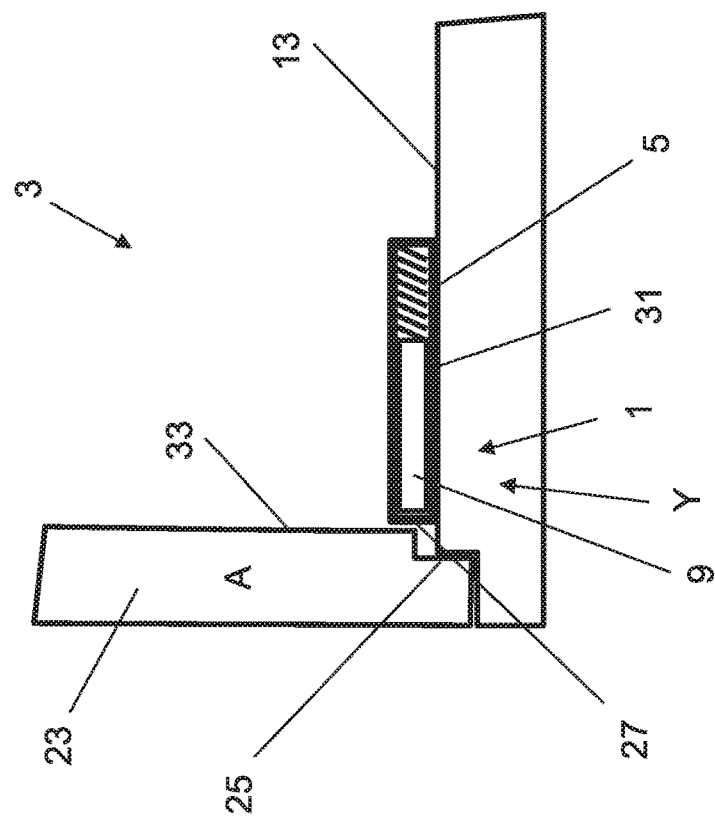

BUMPER PROTECTION DEVICE

RELATED APPLICATIONS

This application claims priority to German Patent Application No. 102017212188.2, filed on Jul. 17, 2017, the entirety of which is herein incorporated by reference.

TECHNICAL FIELD

The present disclosure relates to a bumper protection device and a motor vehicle including the same. A method of use is also disclosed.

BACKGROUND

In order to achieve an improved appearance, bumpers of motor vehicles, in particular of passenger motor vehicles, are often painted in the same color as the motor vehicle. As a result, the overall visual impression of the vehicle is intended to be unified and thereby enhanced. Painted bumpers, however, have a substantially more sensitive exterior surface, which is particularly susceptible to scratches or paint damage. Such scratches or paint damage may occur on the rear bumper when loading and unloading the cargo space, in particular the trunk, of the motor vehicle and/or when pets climb in and out, as examples.

A number of loading systems having bumper protection features are known in the prior art. In DE 100 12 767 A1, a system includes an extendable cargo floor, which is slidable parallel to the vehicle floor in the rear region of the motor vehicle. In order to permit convenient loading of the cargo space, the guide arrangement is able to be lifted relative to the vehicle structure via a loading edge of the cargo space. The cargo floor may then be extended, encompassing the loading edge, manually or by an electric motor.

DE 20 2013 000 332 U1 discloses a loading system for a motor vehicle which comprises two displaceable loading platforms are arranged in the trunk. The first loading platform is able to be pulled out of the trunk and has guide rails for the lateral guidance of the second loading platform. For loading the motor vehicle, the first and/or the second loading platform is extended manually out of the motor vehicle by a respective handle.

As an example of a separately configured loading edge protection system, as disclosed in DE 10 2006 059 670 A1, the risk of damage to the rear bumper when loading and unloading a motor vehicle is reduced. The loading edge protection system may be produced from a durable material, for example metal or stainless steel, and is attached to the loading edge for protecting the rear bumper as cladding.

DE 10 2006 043 223 A1 discloses a bottom platform, which is able to be inserted into a cargo space of a motor vehicle, and which is able to be releasably fixed by an adhesive to the bottom surface of the cargo space. The bottom platform has two guide rails with integrated running rollers for receiving a transport element, which is displaceable inside the cargo space by a user via a grip. A loading edge protection system in the manner of a roller blind is arranged below the bottom platform. The loading edge protection system is able to be extended by a user by a tab into a position of use for covering the bumper bar of the motor vehicle. The loading edge protection system is held by the inherent weight force thereof in the position of use. A restoring mechanism, in order to move the loading edge protection system back from the position of use, is implemented by motive springs and a cable pull.

Also disclosed in DE 196 265 82 C2 is a retracting mechanism for a cargo space cover, the movement thereof being coupled to the closing or opening movement of a pivotably movable rear part. The cargo space cover is configured as a flat roller blind which is held on a roller blind shaft so as to be able to be rolled up and unrolled. A restoring device in the form of a restoring spring is integrated in the roller blind shaft. An additional restoring arrangement is coupled to the pivoting movement of the rear part by a cable pull, such that when the rear part is closed the restoring arrangement causes the roller blind to be tensioned.

A displaceable loading platform for a trunk of a motor vehicle is disclosed in GB 635 187 A. A movement of the loading platform is coupled to the movement of the trunk cover, so that a retraction and/or extension of the loading platform causes a closing and/or opening of the trunk. The coupling mechanism is in this case implemented, for example, by chains or a system of connecting elements or via an electrical or fluid motor.

A motor vehicle comprising a retractable and/or extendable cargo floor is disclosed in DE 10 2008 010 923 A1. The cargo floor is movably displaceable via rails along a longitudinal extent of the motor vehicle. When opening the cargo space, a lower liftgate is able to be lowered by hinges behind a rear bumper of the motor vehicle. The cargo floor is coupled to the movement of the lower liftgate, such that said cargo floor slides out of the cargo space when the lower liftgate is opened. To this end, a gear mechanism is coupled to the hinges, so that a rotational movement of the hinges is converted into a movement of the cargo floor. The gear ratio of the gear mechanism is designed such that the cargo floor fully encompasses the lower liftgate, provided the liftgate is fully opened.

SUMMARY

A bumper protection device for a motor vehicle according to an exemplary aspect of the present disclosure includes, among other things, a protective strip moveable between a retracted position and an extended position, a spring biasing the protective strip to the extended position, and a closure arranged such that movement of the closure to a closed position urges the protective strip to the retracted position, and such that movement of the closure to an open position permits movement of the protective strip to the extended position.

In a further non-limiting embodiment of the foregoing bumper protection device, the device further includes a guide rail. Further, the spring is arranged at least partially within the guide rail.

In a further non-limiting embodiment of any of the foregoing bumper protection devices, the guide rail includes an outer surface flush with a surface of a cargo space.

In a further non-limiting embodiment of any of the foregoing bumper protection devices, the guide rail includes an outer surface fastened to a surface of a cargo space.

In a further non-limiting embodiment of any of the foregoing bumper protection devices, when the protective strip is in the extended position, the protective strip protrudes over a bumper of the motor vehicle.

In a further non-limiting embodiment of any of the foregoing bumper protection devices, when the protective strip is in the extended position, the protective strip projects further rearward than the bumper.

In a further non-limiting embodiment of any of the foregoing bumper protection devices, a biasing force of the spring acts in a direction of movement of the protective strip.

In a further non-limiting embodiment of any of the foregoing bumper protection devices, the spring is a restoring spring and is compressed in the retracted position to store potential energy, and the potential energy corresponds to a path length over which the protective strip is movable.

In a further non-limiting embodiment of any of the foregoing bumper protection devices, the spring is one of a plurality of springs of the bumper protection device, the protective strip is one of a plurality of protective strips of the bumper protection device; and the guide rail is one of a plurality of guide rails of the bumper protection device.

In a further non-limiting embodiment of any of the foregoing bumper protection devices, an outer protective surface of the protective strip is arranged in a complementary manner to an edge of the closure.

In a further non-limiting embodiment of any of the foregoing bumper protection devices, the closure is a liftgate.

A motor vehicle according to an exemplary aspect of the present disclosure includes, among other things, a closure, a bumper, and a bumper protection device. The bumper protection device includes a protective strip moveable between a retracted position and an extended position and a spring biasing the protective strip to the extended position. Further, the closure is arranged such that movement of the closure to a closed position urges the protective strip to the retracted position, and such that movement of the closure to an open position permits movement of the protective strip to the extended position.

In a further non-limiting embodiment of the foregoing motor vehicle, the vehicle further includes a guide rail. Additionally, the spring is arranged at least partially within the guide rail.

In a further non-limiting embodiment of any of the foregoing motor vehicles, the guide rail includes an outer surface flush with a surface of a cargo space of the motor vehicle.

In a further non-limiting embodiment of any of the foregoing motor vehicles, the guide rail includes an outer surface fastened to a surface of a cargo space of the motor vehicle.

In a further non-limiting embodiment of any of the foregoing motor vehicles, when the protective strip is in the extended position, the protective strip protrudes over the bumper.

In a further non-limiting embodiment of any of the foregoing motor vehicles, when the protective strip is in the extended position, the protective strip projects further rearward than the bumper.

In a further non-limiting embodiment of any of the foregoing motor vehicles, the closure is a liftgate.

A method according to an exemplary aspect of the present disclosure includes, among other things, moving a protective strip, under the biasing force of a spring, from a retracted position to an extended position over a bumper of a motor vehicle as a closure opens.

In a further non-limiting embodiment of the foregoing method, when in the extended position, the protective strip projects further rearward than the bumper.

BRIEF DESCRIPTION OF THE DRAWINGS

FIG. 1A is a schematic view of an exemplary embodiment of an integrated bumper protection device, with a liftgate in a closed position.

FIG. 1B is a schematic view of the exemplary embodiment according to FIG. 1A, with the liftgate in an open position.

FIG. 2A is a schematic view of an exemplary embodiment of a retrofittable bumper protection device, with a liftgate in a closed position.

FIG. 2B is a schematic view of the exemplary embodiment according to FIG. 2A, with the liftgate in an open position.

DETAILED DESCRIPTION

Figure 3B:
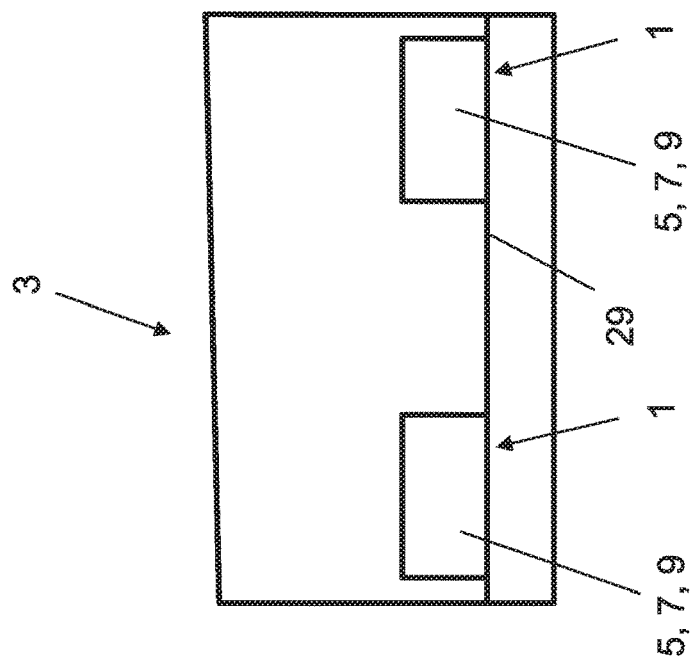
FIG. 3B a schematic view of a further exemplary arrangement of a bumper protection device along a loading edge of a motor vehicle from a rear view.

The present disclosure provides a bumper protection device which is of simple design, which deploys automatically, and which is cost-effective so as to allow retrofitting to different types of motor vehicles.

A bumper protection device is proposed for a bumper of a motor vehicle, in particular a passenger motor vehicle. The bumper protection device includes at least one guide rail and a protective strip. The guide rail is fastened and/or is fastenable inside a cargo space, in particular a trunk, of the motor vehicle, and extends substantially parallel to the longitudinal axis of the motor vehicle. In one example, protective strip moves along the longitudinal axis of the vehicle inside the guide rail. The cargo space is closable by a liftgate which is pivotable. While the term "liftgate" is used herein, it should be understood that this disclosure extends to trunks and tailgates.

In an open position of the liftgate, the protective strip may be arranged in an extended position. The protective strip comprises an external protective surface which is remote from the cargo space and in the extended position protrudes over the bumper of the motor vehicle. In one example, the external protective surface of the protective strip in the extended position is the component of the entire motor vehicle furthest to the outside, so that the protective strip intercepts contact by objects, the cargo space being intended to be loaded thereby, and/or pets which climb into or out of the cargo space. In this manner damage to the bumper is avoided. In a closed position of the liftgate, the protective strip is arranged in a retracted position, wherein the protective strip is located entirely within the cargo space and, in particular, entirely within the guide rail. In one example, the protective surface terminates flush with a rear end of the guide rail facing in the direction of the rear of the motor vehicle.

According to one example of this disclosure, the bumper protection device comprises at least one spring having a spring force. The spring force may be adjustable. A spring within the meaning of this disclosure is any energy storage device which stores energy when tensioned and releases this energy when relaxed. Springs within the meaning of the disclosure, therefore, may be for example spiral springs or piston-cylinder units, for example a gas pressure spring, without these exemplary embodiments intending to act in a limiting manner.

By opening the liftgate, the protective strip is automatically displaceable by the spring force from the retracted position over a predetermined path length into the extended position. In this manner, the protective function is automatically present for reducing damage to the bumper, by the protective strip extending as the liftgate is opened. When closing the liftgate, the protective strip is displaceable from the extended position over the same path length, counter to the spring force, into the retracted position. In an advantageous embodiment, the protective strip is produced from a rigid, durable material and, when closing and/or folding down the liftgate, is operatively connected thereto in a force-transmitting manner by the protective surface.

According to an example of this disclosure, in order to produce the spring force, the at least one spring is arranged inside the guide rail or is at least partially encompassed thereby. In this example, the spring includes a front end facing in the direction of the front of the motor vehicle and contacting a rear inner surface of the guide rail. The spring further includes a rear end contacting a front force application surface of the protective strip.

In one particular embodiment, the at least one spring is configured as a restoring spring. For instance, in the closed position of the liftgate, the spring is compressed for storing potential energy. When the liftgate is in the closed position, a liftgate inner surface, which faces in the direction of the front of the motor vehicle, contacts the protective surface of the protective strip, whereby a force for compressing the spring is transmitted thereto. The potential energy which is stored by the spring, in particular the spring path, corresponds to the path length over which the protective strip is automatically movable by opening the liftgate. Via the spring hardness and/or the spring path, therefore, the path length is adjustable and adaptable to different geometries of cargo space and/or bumper.

In optional and/or alternative embodiments, the bumper protection device may have just one or a plurality of springs and/or just one or a plurality of guide rails and/or just one or a plurality of protective strips. For example, two guide rails are arranged along the outer edges of the loading surface parallel to the longitudinal axis of the vehicle and each have a protective strip, the protective surface thereof being arranged along at least one part of a loading edge of the cargo space. In a further variant, a guide rail extends over the entire width of the loading surface and/or the along the entire loading edge, i.e. at right angles to the longitudinal axis of the motor vehicle, and is designed for receiving one or more springs and one or more protective strips. Further still, the protective surface of one or more protective strips may extend along the entire loading edge so that the protective function is present over the entire path of the rear bumper.

When closing the liftgate, in order to displace the protective strip in the most convenient manner possible into the retracted position, it is expedient that the protective surface of the protective strip is arranged in a complementary manner to a lower liftgate edge.

For retrofitting a motor vehicle, the bumper protection device is releasably or fixedly fastenable and/or connectable by one or more fasteners in the cargo space of the motor vehicle. In particular, the guide rail may be fastened to the loading surface of the cargo space and/or to a lateral cargo space boundary, in particular the cladding of the bodywork inner surface. Clamps and/or screws and/or connections by adhesive are considered fasteners in this disclosure. A particular embodiment comprises a hook-and-loop fastener (i.e., Velcro®) connection in which a lower surface of the guide rail is connected by the hook-and-loop fastener connection to the loading surface which is covered by fabric.

A motor vehicle according to this disclosure has a bumper protection device integrated in a cargo space. In this case, either an upper surface of the guide rail terminates flush with the loading surface of the motor vehicle or the guide rail is partially or entirely covered by the loading surface, wherein in particular only the protective surface of the protective strip remains visible for an observer.

In the various figures the same parts are provided with the same reference numerals, which is why generally these parts are only described once.

In FIG. 1A, an exemplary embodiment of a bumper protection device 1 is shown schematically. The bumper protection device 1 is integrated in the cargo space 3 of a motor vehicle (not shown). The motor vehicle is a sport utility vehicle (SUV) in this example, hence the reference to a "liftgate." It should be understood that this disclosure can extend to other types of vehicles, including vehicles with trunks or tailgates.

The bumper protection device 1 has a guide rail 5, a spring 7, in this case by way of example configured as a spiral spring, and a protective strip 9. An upper outer surface 11 of the guide rail 5 faces the cargo space and terminates flush with a loading surface 13, which also faces the cargo space 3. The spring 7 is arranged inside the guide rail 5 and is supported by a front end 15 facing in the direction of the front of the motor vehicle on a rear inner surface 17 of the guide rail 5 which faces in the direction of the rear of the motor vehicle. A rear end 19 of the spring 7, facing in the direction of the rear of the motor vehicle, is supported on a force application surface 21 of the protective strip 9. A liftgate 23 is pivotably mounted about an axis (not shown) and is in a closed position A in FIG. 1A. A liftgate edge 25 is arranged in a complementary manner to a protective surface 27 of the protective strip 9 and acts thereon in a force-transmitting manner, whereby the spring 7 is compressed. The protective strip 9 is located in a position Y retracted into the guide rail 5 when the liftgate 23 is closed, as in FIG. 1A.

In FIG. 1B, the liftgate 23 has rotated about the axis (again, not shown), and is shown in an open position B. In the open position, the liftgate edge 25 no longer acts on the protective surface 27, and thus the spring 7 is relaxed and the protective strip 9 is displaced by the spring force over a path length X into an extended position Z. The protective surface 27 protrudes over a loading edge 29 of the cargo space 3 and a bumper of the motor vehicle, not shown. In particular, in this example, the protective surface 27 projects further rearward than the loading edge 29. Thus, the protective surface 27 provides a protective function.

FIGS. 2A and 2B show a schematic view of a retrofitted bumper protection device 1 in a closed position A of the liftgate 23 (FIG. 2A) and an open position B of the liftgate 23 (FIG. 2B). The retrofitted design differs from the integrated design (according to FIGS. 1A and 1B) in that the guide rail 5 is arranged on the loading surface 13 of the cargo space 3 and is fixedly or releasably connected thereto. To this end, the guide rail 5 has on its lower outer surface 31 fastening elements, such as for example screws, clamps, clips or a hook-and-loop fastener or an adhesive connection. In this example, the protective surface 27 of the protective strip 9 bears in the closed position A against an inner surface 33 of the liftgate 23 above the liftgate edge 25 and is located in a retracted position Y. In the open position B, the protective strip 9 is located in an extended position Z, wherein the protective surface 27 protrudes over the loading edge 29. A gap is formed between the protective strip 9 and the loading edge 29 due to the arrangement of the bumper protection device. Again, in FIG. 2B, the protective surface 27 projects further rearward than the loading edge 29.

As may be identified in FIGS. 1A to 2B, the guide rail 5 is designed in the manner of a housing. Viewed in section, the guide rail 5 may be designed in a U-shaped manner with a bottom web 35 and two U-shaped arms 37. The two U-shaped arms 37 may have an identical length. The spring 7 is supported on the bottom web 35, said spring being arranged with its opposing end on the protective strip 9. The guide rail 5 is expediently open opposite the bottom web 35. If the liftgate 23 is closed, said liftgate at least partially forms a closure of the guide rail 5 opposing the bottom web 35, as may be identified in the figures. The guide rail 5 may also be sealed opposite the bottom web by suitable measures against the penetration of foreign bodies. Conceivable are sealing elements which are arranged on the two U-shaped arms or even on only one of the U-shaped arms and are oriented in the direction of the respective other U-shaped arm. In the exemplary embodiment shown in FIGS. 1A and 1B, the upper U-shaped arm 37 in the drawing plane is arranged flush with the loading surface 13. In the exemplary embodiment shown in FIGS. 2A and 2B, the lower U-shaped arm in the drawing plane (lower outer surface 31) is fastened to the loading surface 13 as disclosed. The design of the guide rail 5 in the manner of a housing causes the movement of the protective strip 9 to be able to take place unhindered into the respective position, wherein a penetration of foreign bodies into the guide rail 5 is able to be avoided. Both the design according to FIGS. 1A and 1B and the design according to FIGS. 2A and 2B may be provided as mass-produced designs or as a retrofitted kit.

Figure 3A:
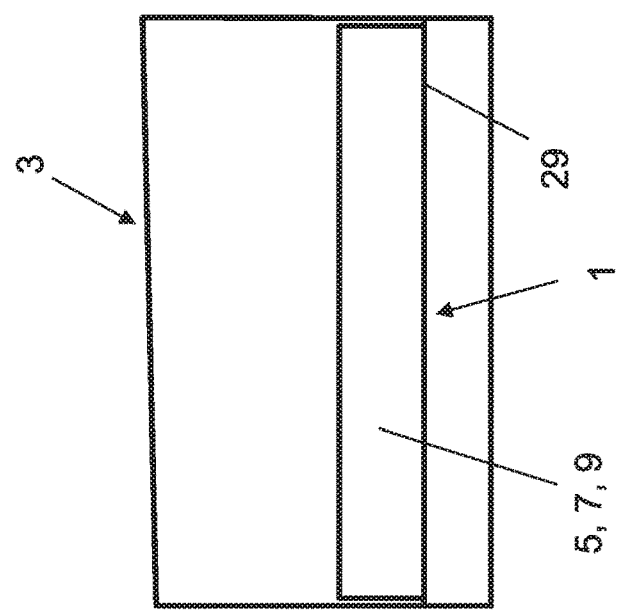
FIG. 3A is a schematic view of an exemplary arrangement of a bumper protection device along a loading edge of a motor vehicle from a rear view.

FIGS. 3A and 3B show a schematic view of two embodiments for arranging a bumper protection device 1 along the loading edge 29 of a cargo space 3 of a motor vehicle from a rear view. In FIG. 3A a bumper protection device 1 extends along the entire length of the loading edge 29. The one bumper protection device 1 has a single guide rail 5, one or more springs 7 and one or more protective strips 9. A plurality of springs 7 may be arranged spaced apart at regular intervals relative to one another inside the guide rail 5 and in each case are supported on a single continuous protective strip 9. In FIG. 3B two bumper protection devices 1 spaced apart from one another are shown. The bumper protection devices 1 in each case have a guide rail 5, at least one spring 7 and at least one protective strip 9. Instead of the two bumper protection devices 1 any number of bumper protection devices 1, adjacent to one another at regular intervals, may also be arranged along the loading edge 29 of the cargo space 3.

Directional terms such as "forward," "rearward," etc., are used with reference to the normal operational attitude of the vehicle and should not be considered limiting. It should be understood that terms such as "about," "substantially," and "generally" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A bumper protection device for a motor vehicle, comprising:
   a protective strip moveable along a linear path between a retracted position and an extended position;
   a spring biasing the protective strip to the extended position; and
   a closure arranged such that movement of the closure to a closed position urges the protective strip to the retracted position, and such that movement of the closure to an open position permits movement of the protective strip to the extended position.

2. The bumper protection device as recited in claim 1, further comprising a guide rail, the spring arranged at least partially within the guide rail.

3. The bumper protection device as recited in claim 2, wherein the guide rail includes an outer surface flush with a surface of a cargo space.

4. The bumper protection device as recited in claim 2, wherein the guide rail includes an outer surface fastened to a surface of a cargo space.

5. The bumper protection device as recited in claim 1, wherein, when the protective strip is in the extended position, the protective strip protrudes over a bumper of the motor vehicle.

6. The bumper protection device as recited in claim 5, wherein, when the protective strip is in the extended position, the protective strip projects further rearward than the bumper.

7. The bumper protection device as recited in claim 1, wherein a biasing force of the spring acts in a direction of movement of the protective strip.

8. The bumper protection device as recited in claim 7, wherein the spring is a restoring spring and is compressed in the retracted position to store potential energy, and wherein the potential energy corresponds to a path length over which the protective strip is movable.

9. The bumper protection device as recited in claim 2, wherein:
   the spring is one of a plurality of springs of the bumper protection device;
   the protective strip is one of a plurality of protective strips of the bumper protection device; and
   the guide rail is one of a plurality of guide rails of the bumper protection device.

10. The bumper protection device as recited in claim 1, wherein an outer protective surface of the protective strip is arranged in a complementary manner to an edge of the closure.

11. A bumper protection device for a motor vehicle, comprising:
    a protective strip moveable along a linear path between a retracted position and an extended position;
    a spring biasing the protective strip to the extended position; and
    a liftgate arranged such that movement of the liftgate to a closed position urges the protective strip to the retracted position, and such that movement of the liftgate to an open position permits movement of the protective strip to the extended position.

12. A motor vehicle, comprising:
    a liftgate;
    a bumper; and
    a bumper protection device, including a protective strip moveable between a retracted position and an extended position;

a spring biasing the protective strip to the extended position;

a guide rail, the spring arranged at least partially within the guide rail; and wherein the liftgate is arranged such that movement of the liftgate to a closed position urges the protective strip to the retracted position, and such that movement of the liftgate to an open position permits movement of the protective strip to the extended position.

13. The motor vehicle as recited in claim 12, wherein the guide rail includes an outer surface flush with a surface of a cargo space of the motor vehicle.

14. The motor vehicle as recited in claim 12, wherein the guide rail includes an outer surface fastened to a surface of a cargo space of the motor vehicle.

15. The motor vehicle as recited in claim 12, wherein, when the protective strip is in the extended position, the protective strip protrudes over the bumper.

16. The motor vehicle as recited in claim 15, wherein, when the protective strip is in the extended position, the protective strip projects further rearward than the bumper.

* * * * *